(12) United States Patent
Kent

(10) Patent No.: US 6,205,697 B1
(45) Date of Patent: Mar. 27, 2001

(54) FISHING LURES AND METHODS OF MAKING FISHING LURES

(76) Inventor: Wayne Kent, P.O. Box 6162, Tyler, TX (US) 75711

( * ) Notice: Subject to any disclaimer, the term of this patent is extended or adjusted under 35 U.S.C. 154(b) by 0 days.

(21) Appl. No.: 09/659,907

(22) Filed: Sep. 12, 2000

Related U.S. Application Data

(62) Division of application No. 09/422,764, filed on Oct. 22, 1999.
(51) Int. Cl.[7] .......................... A01K 85/00; A01K 85/01; B29C 39/12; B28B 1/38
(52) U.S. Cl. ..................... 43/42.53; 264/271.1; 264/275; 264/246; 264/255; 264/301
(58) Field of Search ................. 43/42.53, 42.06, 43/42.24, 42.28, 42.29, 42.32, 42.33; 264/271.1, 275, 279, 246, 250, 255, 301, 305

(56) References Cited

U.S. PATENT DOCUMENTS

| | | | |
|---|---|---|---|
| 1,323,458 | * 12/1919 | Dills | ..................... 43/42.33 |
| 1,527,659 | * 2/1925 | Wilkie | ..................... 264/255 |
| 1,752,371 | * 4/1930 | Daniels | ..................... 264/279 |

(List continued on next page.)

FOREIGN PATENT DOCUMENTS

| | | |
|---|---|---|
| 5-103565 | * 4/1993 | (JP) . |
| 10-327709 | * 12/1998 | (JP) . |
| 3-292841 | * 12/1998 | (JP) . |

*Primary Examiner*—Darren W. Ark
(74) *Attorney, Agent, or Firm*—Charles M. Kaplan

(57) ABSTRACT

A unitary or one-piece, integral soft bodied plastic fishing lure may be multi-layered and have two or more distinct colors. Soft bodied fishing lures may emit salt flavors directly into the adjacent water that dissolves salt grains exposed at the surface of the lures directly to the water. Methods of making the multi-colored and salt emitting lures by dipping mandrels into molten plastic and supplies of salt grains are disclosed.

20 Claims, 4 Drawing Sheets

U.S. PATENT DOCUMENTS

| | | | | |
|---|---|---|---|---|
| 2,041,143 | * | 5/1936 | Olson | 264/255 |
| 2,139,545 | * | 12/1938 | Gammeter | 264/305 |
| 2,188,753 | * | 1/1940 | Jennings | 43/42.32 |
| 2,299,039 | * | 10/1942 | Scherer | 264/301 |
| 2,500,494 | * | 3/1950 | Jeffers | 43/42.53 |
| 2,525,272 | * | 10/1950 | Rhoton | 264/255 |
| 2,636,304 | * | 4/1953 | Swenson | 43/42.24 |
| 2,643,418 | * | 6/1953 | Auldridge | 264/275 |
| 2,718,668 | * | 9/1955 | Burke | 264/255 |
| 2,753,651 | * | 7/1956 | Fisher | 43/42.53 |
| 2,815,896 | * | 12/1957 | Shapero et al. | 264/305 |
| 3,213,173 | * | 10/1965 | Cobb | 264/279 |
| 3,289,345 | * | 12/1966 | Reininger et al. | 43/42.24 |
| 3,320,344 | * | 5/1967 | Slipp | 264/255 |
| 3,579,895 | * | 5/1971 | Orn et al. | 43/42.06 |
| 3,803,747 | * | 4/1974 | Cartwright | 43/42.28 |
| 3,820,269 | * | 6/1974 | Rae | 43/42.33 |
| 3,822,211 | | 7/1974 | Morton | 43/42.06 |
| 3,863,378 | * | 2/1975 | Walker | 43/42.28 |
| 3,971,152 | | 7/1976 | Husson | 43/42.06 |
| 4,214,397 | * | 7/1980 | Kent | 43/42.32 |
| 4,215,506 | | 8/1980 | LeBoeuf | 43/42.05 |
| 4,245,420 | * | 1/1981 | Carr | 43/42.06 |
| 4,335,495 | * | 6/1982 | Buchanan | 43/42.53 |
| 4,530,179 | | 7/1985 | Larew | 43/42.06 |
| 4,637,159 | * | 1/1987 | Kulis | 43/42.32 |
| 4,638,584 | * | 1/1987 | Lindsay | 43/42.33 |
| 4,676,020 | * | 6/1987 | Taylor et al. | 43/42.06 |
| 4,741,120 | * | 5/1988 | Cota et al. | 43/42.33 |
| 4,790,100 | | 12/1988 | Green | 43/42.26 |
| 4,887,376 | * | 12/1989 | Sibley et al. | 43/42.06 |
| 4,922,646 | * | 5/1990 | Basgal | 43/42.33 |
| 4,993,183 | * | 2/1991 | Carver | 43/42.06 |
| 5,007,193 | * | 4/1991 | Goodley et al. | 43/42.28 |
| 5,167,089 | * | 12/1992 | Schriefer | 43/42.28 |
| 5,216,829 | | 6/1993 | Morton | 43/42.06 |
| 5,251,395 | | 10/1993 | Wicklund | 43/42.25 |
| 5,266,323 | * | 11/1993 | Guthrie et al. | 43/42.06 |
| 5,270,044 | * | 12/1993 | Fulmer et al. | 43/42.06 |
| 5,284,607 | * | 2/1994 | Chen | 264/255 |
| 5,333,405 | * | 8/1994 | Bowles | 43/42.06 |
| 5,408,780 | | 4/1995 | Chambers, Sr. | 43/42.53 |
| 5,490,344 | | 2/1996 | Bussiere | 43/17.5 |
| 5,625,975 | * | 5/1997 | Imes | 43/42.24 |
| 5,664,363 | * | 9/1997 | Keenan | 43/42.06 |
| 5,667,739 | * | 9/1997 | Kato | 264/301 |
| 5,689,910 | | 11/1997 | Kato | 43/42.24 |
| 5,725,892 | * | 3/1998 | Gibbs | 43/42.06 |
| 5,894,693 | * | 4/1999 | Davie | 43/42.24 |
| 5,956,888 | * | 9/1999 | Vreeland et al. | 43/42.53 |
| 6,003,264 | * | 12/1999 | Hnizdor | 43/42.33 |
| 6,018,902 | * | 2/2000 | Gudermuth et al. | 43/42.32 |

* cited by examiner

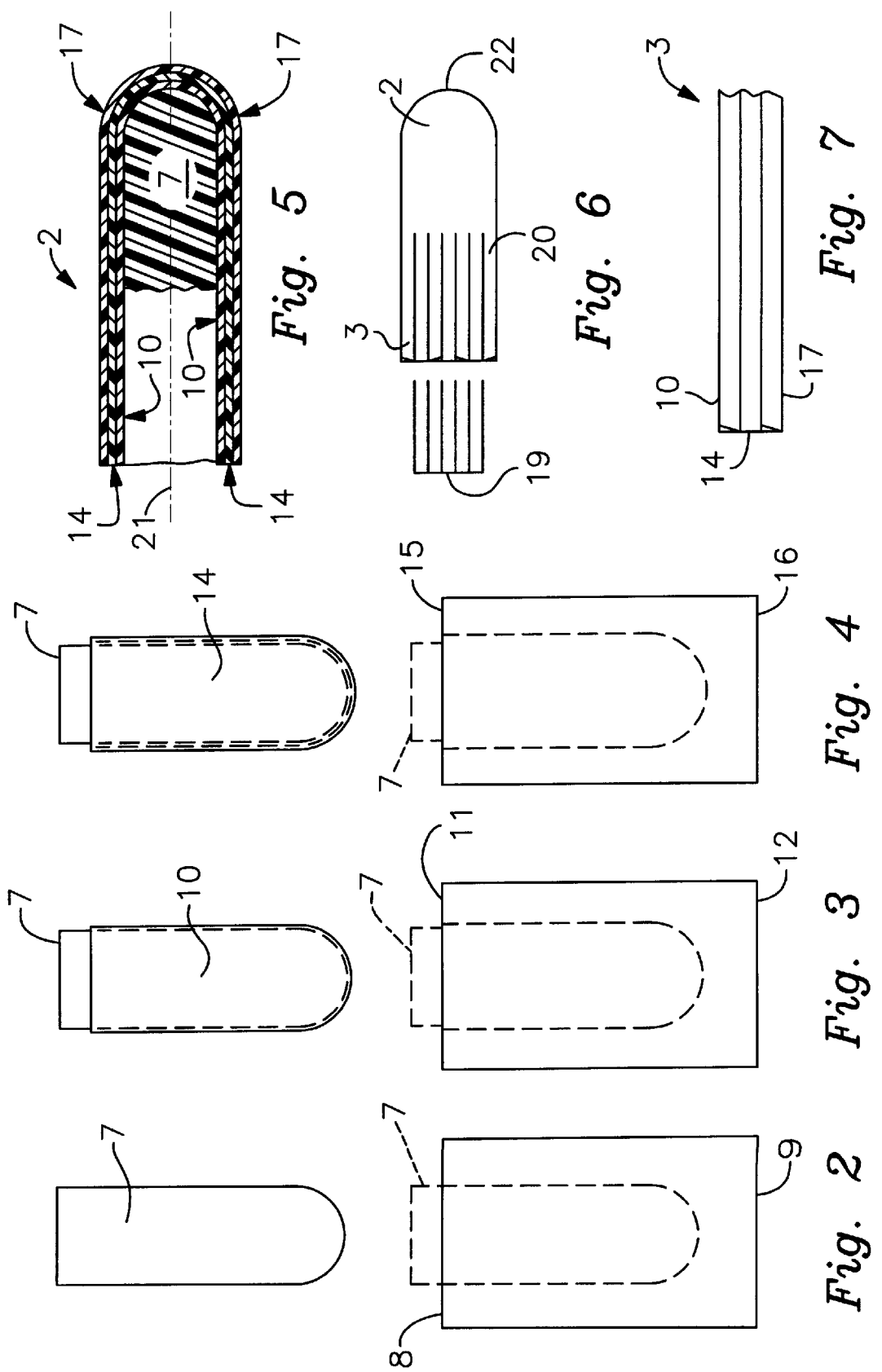

FISHING LURES AND METHODS OF MAKING FISHING LURES

This application is a division of Ser. No. 09/422,764, filed Oct. 22, 1999, now pending.

BACKGROUND OF THE INVENTION

This invention relates to fishing lures and methods of making them, and more particularly to improved multicolored and salt emitting soft, flexible plastic lures.

Tubular soft plastic fishing lures have been made by coating a solid metal mandrel with molten plastic resin, allowing the plastic to harden and then removing the resulting hollow tubular lure from the mandrel. Attempts to make such tubular lures with two distinct colors from two differently colored thermoplastic resins have not been successful because the plastics run together and the colors become cloudy or mix into an off color when one or both plastics is hot enough to melt. The clouding of the plastics prevents transmission of light through lures that are made from translucent plastics.

The molten plastic from which such soft plastic lures are made has been impregnated with powdered salt in order to impart a salty taste to the lures. This dispersion of finely divided salt throughout the plastic makes the lure colors dull and difficult to control, and the impregnated salt makes translucent plastic lures look cloudy instead of clear, and it diminishes the effectiveness of tiny reflective speckles dispersed within translucent plastics. Also, impregnation with salt distorts the shape of some lure bodies, and impregnation of salt into the interior of a lure delays the release and dissolving of the salt into the water. Plastic lures impregnated with powdered salt are usually lost or damaged before all of the salt can migrate from the interior of the lure into the water being fished, so the salt remaining in the lure is wasted.

OBJECTIVES OF THE INVENTION

Accordingly, it is an object of this invention to provide improved flexible soft bodied plastic fishing lures.

Another object is to provide improved salt emitting fishing lures.

An additional object is to provide multicolored soft plastic fishing lures with distinct colors that do not become cloudy or blur into each other.

Another object is to provide salt emitting fishing lures that immediately release salt into the water being fished.

A further object is to provide salt emitting fishing lures that include salt crystals large enough to attract fish by reflecting light.

An additional object is to provoke strikes from game fish by providing fishing lures with surfaces that resemble the gills of a bait fish or the body parts of an injured or spawning fish.

Another object is to provide multicolored multilayered soft bodied fishing lures that have embedded light reflecting tiny speckles that are visible through an unclouded transparent outer colored plastic layer.

A further object is to provide unitary, integral, multicolored and salt emitting soft bodied plastic fishing lures that are rugged, economical, highly attractive to fish, easy for fishermen to use, and which do not possess defects found in similar prior art fishing lures.

A further object is to provide improved methods for making each of the types of fishing lures described above.

Another object is to prevent the mixing and blurring of colors when multicolored plastic fishing lures are made by dipping a mandrel into molten thermoplastic resins.

Another object is to affix visible salt particles to the exterior surface of a plastic fishing lure, without impregnating the plastic with salt.

Other objects and advantages of the fishing lures and manufacturing methods incorporating this invention will be found in the specification and claims and the scope of the invention will be set forth in the claims.

DESCRIPTION OF THE DRAWING

FIG. 2 is a schematic side view of one method step of this invention.

FIG. 3 is a schematic side view of another method step of this invention.

FIG. 4 is a schematic side view of another method step of this invention.

FIG. 5 an enlarged cross sectional schematic side view one embodiment of a fishing lure in accord with this invention.

FIG. 6 is a schematic side view of the fishing lure of FIG. 5 showing another method step.

FIG. 7 is an enlarged side view of one of the streamers produced by the method step illustrated in FIG. 6.

DESCRIPTION OF THE INVENTION

Figure 1:
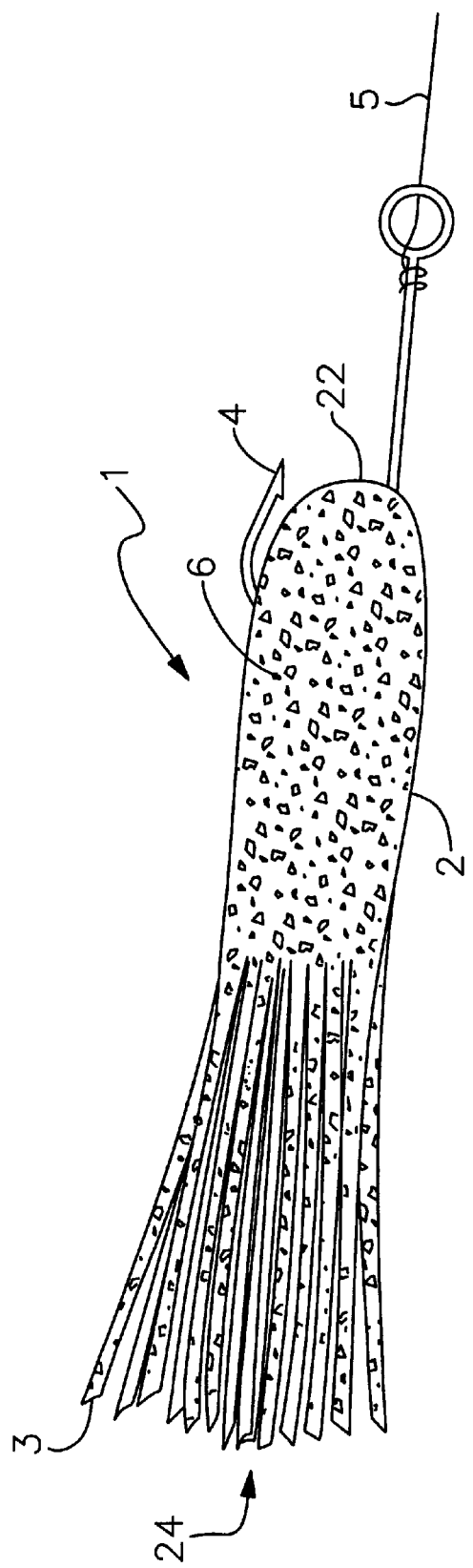
FIG. 1 is a perspective view of an embodiment of a fishing lure in accord with this invention.

The drawing shows a fishing lure 1 having an open ended, multilayered and multicolored, salt emitting, soft, flexible, unitary, integral plastic body 2 in accord with this invention, including filamentary tentacles or streamers 3. The lure body 2 is impaled on a hook 4 that has been tied to a fishing line 5 in conventional manner. The lure body 2 should be made from colored soft, resilient, flexible synthetic thermoplastic plastisol resin formulations, such as polyvinyl chloride plasticized with esters of phathalate.

A translucent or semi-transparent colored resin will permit light to pass through the lure but will cause some diffusion of the light rays. A transparent colored resin is a special case of translucence in that the diffusion of light is so slight that objects can be clearly seen through the resin forming the lure body 2. When the plastic resin is not cloudy and is translucent or transparent, tiny reflective particles or speckles 6 can be incorporated into the plastic and dispersed into all parts of the body 2 where they will be visible, as shown in FIG. 1.

One embodiment of the lure 1 has an open ended multi-layered and multicolored body 2 that has been made by applying three differently colored plastic layers to a circular cylindrical mandrel or rod 7. The rod 7 is first dipped into a first supply of molten plastic 8 having a predetermined first color in a container 9, as shown in FIG. 2. When the rod 7 is removed from the container 9, the rod is coated with a first inner layer 10 of plastic having the first color. Then the rod 7 coated with the first layer 10 is dipped into a second supply of molten plastic 11 having a second predetermined color in a container 12, as shown in FIG. 3. When the rod 7 is removed from the container 12, the rod and first layer 10 are coated with a second intermediate layer 14 of plastic having the second color. The rod 7, which is now coated with the first and second layers 10 and 14, is then dipped into a third supply of molten plastic 15 having a third predetermined color in a container 16, as shown in FIG. 4. When the rod 7 is removed from the container 16, the rod and first and second layers 10 and 14 are coated with a third outer layer 17 of plastic having the third color. After the plastic hardens the resulting multilayered hollow tubular lure body 2, as shown in FIG. 5, can be removed by sliding it off of the rod 7. The streamers 3 may be cut in the lure body 2 by a gang of knives 19 that make slices 20 that are generally parallel to the lure central axis 21. The streamers 3 may be cut before or after the body 2 is removed from the rod 7. FIG. 7 shows a multicolored multilayered streamer 3.

The first, second and third colors may be different from each other and still not cause blurring of the first inner plastic layer 10 or the third outer plastic layer 17. Blurring can be prevented by using a neutral color, such as white, for the intermediate plastic layer 14. Blurring can also be prevented by using a secondary color such as green, for the color for the intermediate layer 14, when the inner layer 10 and the outer layer 17 are the primary colors, such as yellow and blue, that produce the secondary color of the layer 14. To prevent blurring when the interior layer 10 and/or the outer layer 17 are translucent or transparent, the intermediate layer 14 should not be either translucent or transparent.

To simulate the gills of a bait fish, the inner layer 10 should be colored red. As the lure body 2 is jerked through the water with a stop and go action, the streamers 3 pulse back and forth toward and the away from the body's front end 22. This action exposes and then hides the red color of the inner layer 10 in apparently the same way the gills of a fleeing bait fish are exposed to a predator game fish, which induces the game fish to strike the lure 1. Similar game fish strike provoking action may be obtained by coloring the inner layer 10 to resemble the intestines of an injured bait fish or the roe of a spawning fish. But these strike producing actions can not be obtained with muddied colors, so the neutral intermediate layer 14 must always be present to prevent blurring of the colors of the inner and outer layers 10 and 17.

Figure 8:
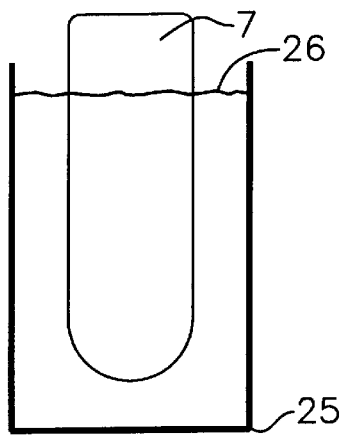
FIG. 8 is a schematic side view of another method step of this invention.
Figure 9:
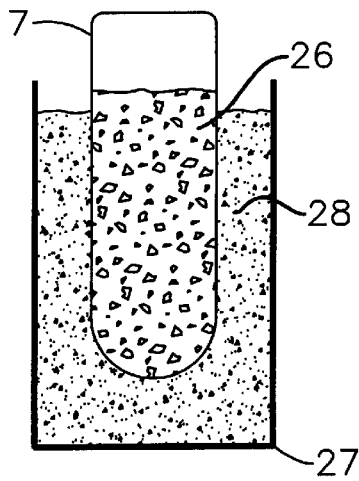
FIG. 9 is a schematic side view of another method step of this invention.
Figure 10:
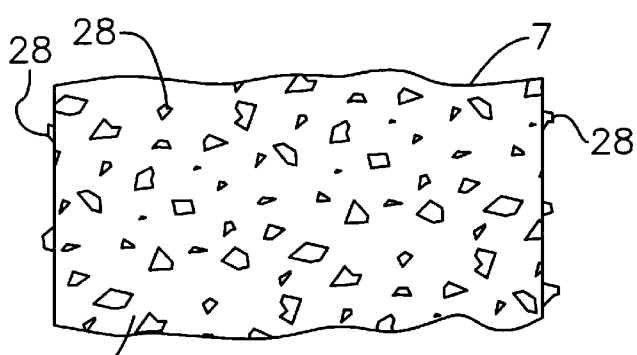
FIG. 10 is an enlarged partial side view of a mandrel coated with salt grains.
Figure 11:
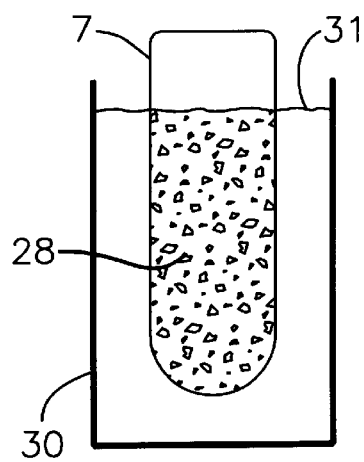
FIG. 11 is a schematic side view of the coated mandrel from FIG. 10 used in another method step of this invention.
Figure 12:
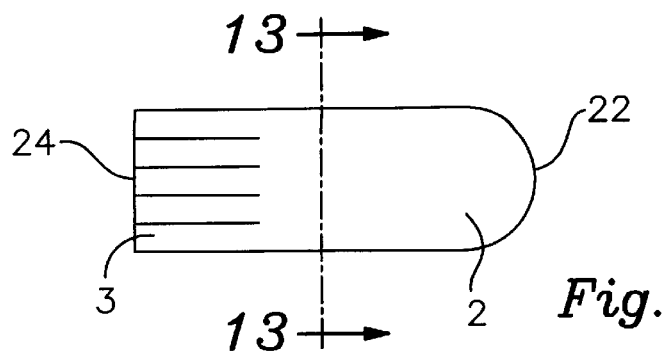
FIG. 12 is a side view of another embodiment of a fishing lure in accord with this invention.
Figure 13:
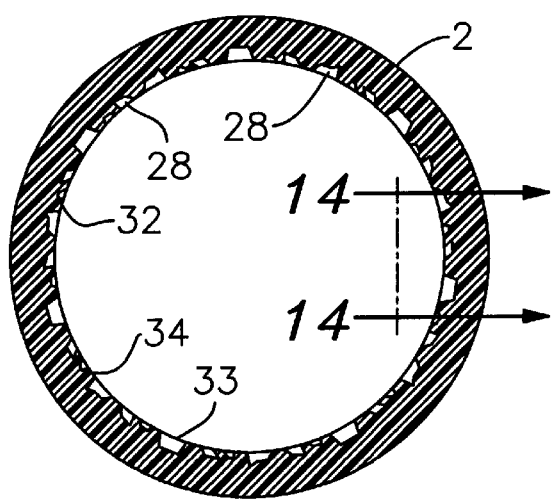
FIG. 13 is an enlarged cross sectional view taken along the line 13—13 in FIG. 12.
Figure 14:
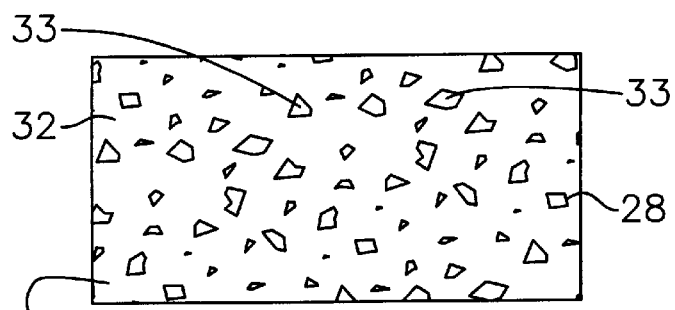
FIG. 14 is an enlarged fragmentary view taken generally along the line 14—14 in FIG. 13.
Figure 15:
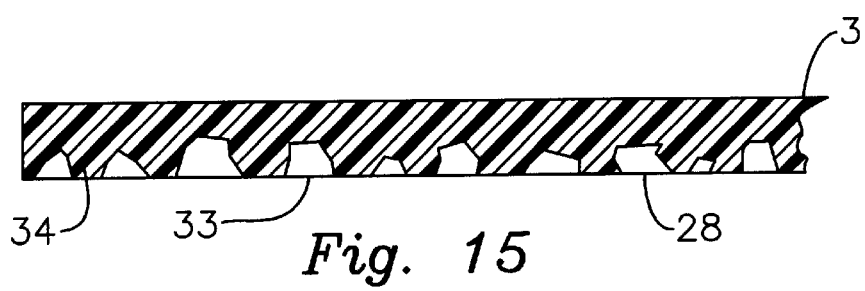
FIG. 15 is an enlarged cross sectional schematic side view of one of the tail strands from the embodiment of FIG. 12.

The lure body 2 can also be made so that it will immediately exude dissolved salt from its open tail end 24 on contact with water. To make a lure with an instant strong salty flavor, a rod 7 first should be coated with a non-aqueous parting agent, such as a petroleum based liquid like SAE 5 weight motor oil. The rod may be coated by spraying the parting agent on the rod, or by dipping a rod 7 into a container 25 of parting agent 26, as shown in FIG. 8. The parting agent 26 must be non-aqueous because the salt will dissolve in water based parting agents. The rod 7 coated with the parting agent 26 is then dipped into a container 27 containing discrete salt grains or particles 28 having widely varying mesh sizes. The parting agent will cause the salt grains 28 to stick to the outer surface of the rod 7 as shown in FIG. 10. Then the rod coated with salt grains can be dipped into a container 30 of resin 31 to form a hollow tubular plastic lure body 2, having streamers 3, as described with regard to FIGS. 2–7. The individual salt grains 28 will be embedded in the exposed inside surface 32 of the tubular body 2, as shown in FIGS. 13 and 14. A portion 33 of the salt grains will be exposed directly to the atmosphere and the water being fished through gaps 34 in the inside surface 32 that are formed when the plastic hardens around the salt grains on the rod 7. The streamers 3 will also have salt grains embedded in their inner surface, as shown in FIG. 15.

Figure 16:
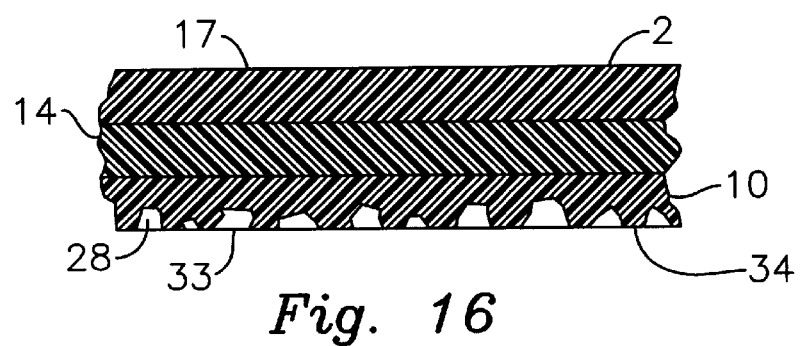
FIG. 16 is an enlarged cross sectional schematic partial side view of another embodiment of the invention.

The salt emitting lure body 2 may also be made into a multilayered multicolored body as described above. After the rod 7 has been removed from the container 30, the rod with the salt grains and a first layer 10 of plastic still on its surface would be dipped into two additional containers of differently colored plastic, as described with reference to FIGS. 2–4. FIG. 16 shows that inside surface 32 of the inner layer 10 of the lure body 2 and streamers would have grains 28 of salt embedded therein. A portion 33 of the surface of the salt grains would also be exposed to the atmosphere in this multilayered multicolored embodiment.

Preferably the salt comprises sodium chloride grains having widely varying mesh sizes. The size of the individual salt grains should be large enough to be visible to the naked eye. Thus when the visible grains reflect light the grains will give a sparkle effect to the lure when the streamers 3 pulse back and forth and when the lure inside surface 32 is visible. The salt grain sizes may vary from that of table salt to that of rock salt. These sizes should be in the range of from about 10 mesh to about 45 mesh. The salt grains 28 must be three dimensional and must not be finely divided, powdered or flaked. Using the relatively large sized grains specified above will prevent the plastic from completely encapsulating the salt, which would not allow the encapsulated salt to be exposed directly to the atmosphere and water being fished. Impregnating the plastic with finely divided salt grains would also distort the shape and color of the lure body, and make translucent and transparent plastics cloudy looking. But exposing relatively large salt grains only at the lure inner surface in accord with this invention does not cloud translucent and transparent plastic or distort lure color and shape.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. A method of making a soft-bodied, multilayered multicolored fishing lure, comprising the steps of:

A. applying a first supply of molten plastic having a first predetermined color to a rod so as to coat said rod with an inner first layer of plastic having said first color;

B. separating said rod coated with said inner first layer of plastic from said first supply of molten plastic and applying a second supply of molten plastic having a second predetermined color that is different from said first predetermined color to said rod so as to coat said first inner layer of plastic with a second intermediate layer of plastic having said predetermined second color;

C. separating said rod coated with said first and second layers of plastic from said second supply of molten plastic and applying a third supply of molten plastic having a third predetermined color that is different from said first and second predetermined colors to said rod so as to coat said second intermediate layer of plastic with a third outer layer of plastic having said third predetermined color; and D. separating said rod from said third supply of molten plastic and removing said soft-bodied multilayered multicolored lure from said rod.

2. The method of making a multicolored fishing lure as defined in claim 1, further comprising applying the layers of plastic to said rod by dipping said rod into containers of molten plastic.

3. The method of making a multicolored fishing lure as defined in claim 1, further comprising applying the layers of plastic to a cylindrical rod.

4. The method of making a multicolored fishing lure as defined in claim 1, further comprising applying a second supply of molten plastic that is a neutral color to said rod coated with said first inner layer so as to form a neutral colored second intermediate layer over said first inner layer and under said third outer layer.

5. The method of making a multicolored fishing lure as defined in claim 1, further comprising applying a second supply of molten plastic that is colored white to said rod coated with said first inner layer so as to form a white second intermediate layer between said first inner layer and under said third outer layer.

6. The method of making a multicolored fishing lure as defined in claim 1, further comprising applying a first supply of molten plastic that is colored red to said rod so as to form a red inner layer under said third outer layer.

7. The method of making a multicolored fishing lure as defined in claim 1, further comprising providing integral flexible skirt strands by slitting said lure adjacent an open end along lines generally parallel to an axis of the lure.

8. The method of making a multicolored fishing lure as defined in claim 1, further comprising applying a third supply of molten plastic which is translucent plastic for said third outer layer.

9. The method of making a multicolored fishing lure as defined in claim 8, further comprising dispersing tiny reflective particles into the translucent third outer layer.

10. The method of making a multicolored fishing lure as defined in claim 1, further comprising applying a third supply of molten plastic which is transparent plastic for said third outer layer.

11. A method of making a salt-emitting soft-bodied, tubular, open-ended, hollow fishing lure, comprising the steps of:

A. wetting the surface of a rod;

B. applying grains of salt to the wetted surface of said rod so as to temporarily hold said grains of salt on said rod;

C. applying a supply of molten plastic to said rod so as to coat said rod with a layer of plastic and to partially coat at least some of said grains of salt with plastic;

D. separating said rod from said supply of molten plastic;

E. cooling the molten plastic until it solidifies;

F. exposing the surface of said grains of salt to the atmosphere by removing said layer of plastic from said rod.

12. The method of making a salt-emitting fishing lure as defined in claim 11, further comprising applying said layer of plastic to said rod by dipping said rod into a container of molten plastic.

13. The method of making a salt-emitting fishing lure as defined in claim 11, further comprising applying the salt grains and the layer of plastic to wetted a cylindrical rod.

14. The method of making a salt-emitting fishing lure as defined in claim 11, further comprising providing integral flexible skirt strands by slitting said lure adjacent its open end along lines generally parallel to an axis of the lure.

15. The method of making a salt-emitting fishing lure as defined in claim 11, further comprising applying salt of a plurality of grain sizes to said rod.

16. The method of making a salt-emitting fishing lure as defined in claim 15, further comprising applying salt grains that are visible to the naked eye to said rod.

17. The method of making a salt-emitting fishing lure as defined in claim 15, further comprising applying salt grains that are three dimensional to said rod.

18. The method of making a salt-emitting fishing lure as defined in claim 11, further comprising applying to said rod, salt grains having sizes in the range of from about 10 mesh to about 45 mesh.

19. The method of making a salt-emitting fishing lure as defined in claim 11, further comprising applying a plurality of layers of plastic having different colors to said rod.

20. A method of making a multicolored salt emitting soft-bodied, flexible, tubular, hollow, unitary, open-ended fishing lure, comprising the steps of:

A. wetting the surface of a rod;

B. applying grains of salt to the wetted surface of said rod so as to temporarily hold said grains of salt on said rod;

C. dipping said rod into a first supply of molten plastic having a first predetermined color so as to coat said rod with an inner first layer of plastic having said first color;

D. separating said rod coated with said inner first layer of plastic from said first supply of molten plastic and dipping said rod into a second supply of molten plastic having a second predetermined color that is different from said first predetermined color so as to coat said first inner layer of plastic with a second intermediate layer of plastic having said predetermined second color;

E. separating said rod coated with said first and second layers of plastic from said second supply of molten plastic and dipping said rod into a third supply of molten plastic having a third predetermined color that is different from said first and second predetermined colors so as to coat said second intermediate layer of plastic with a third outer layer of plastic having said third predetermined color; and F. separating said rod from said third supply of molten plastic;

G. cooling said third outer layer of molten plastic until it solidifies; and

H. exposing the surface of said grains of salt to the atmosphere by removing the layers of multicolored plastic from said rod.

* * * * *